(12) United States Patent
Sanchez

(10) Patent No.: US 7,459,074 B1
(45) Date of Patent: *Dec. 2, 2008

(54) WASTE WATER FILTERING SYSTEM

(76) Inventor: Robert M. Sanchez, 1470 No. Brighton St., La Habra, CA (US) 90631

( * ) Notice: Subject to any disclaimer, the term of this patent is extended or adjusted under 35 U.S.C. 154(b) by 0 days.

This patent is subject to a terminal disclaimer.

(21) Appl. No.: 11/932,877

(22) Filed: Oct. 31, 2007

Related U.S. Application Data

(63) Continuation-in-part of application No. 11/829,830, filed on Jul. 27, 2007.

(51) Int. Cl.
*B01D 35/00* (2006.01)

(52) U.S. Cl. .................................................. 210/94

(58) Field of Classification Search ............... 210/94, 210/693
See application file for complete search history.

(56) References Cited

U.S. PATENT DOCUMENTS 4,795,556 A * 1/1989 Brotea et al. ............... 210/94
5,662,791 A * 9/1997 Hurst et al. ................. 210/94

2007/0039978 A1 * 2/2007 Scheugenpflug ............ 222/252

* cited by examiner

*Primary Examiner*—Chester T. Barry
(74) *Attorney, Agent, or Firm*—Kenneth L. Green; Edgar W. Averill, Jr.

(57) ABSTRACT

A waste water filtration system filters polluted waste water from various waste water sources including fire sprinkler systems and fire hydrants. The system includes a clear flexible hose connecting a female swivel connection on, for example, a Fire Department Connection (FDC) to a mobile filtering system. The clear hose allows the observation of a waste water flow from the waste water source to ensure that a complete flushing has been accomplished. The filtering system includes a stainer to capture large particles, a filter to capture small particles, and a chemically selective sponge to capture, for example, oil, and destroy bacteria. The filtering system allows compliance with NFPA Standards, California State Fire Marshal's "Title 19 Regulations for maintaining fire sprinkler systems, and Federal Clean Water laws, Federal Coastal Zone laws, and local city ordinances for releasing liquids into storm drains.

11 Claims, 4 Drawing Sheets

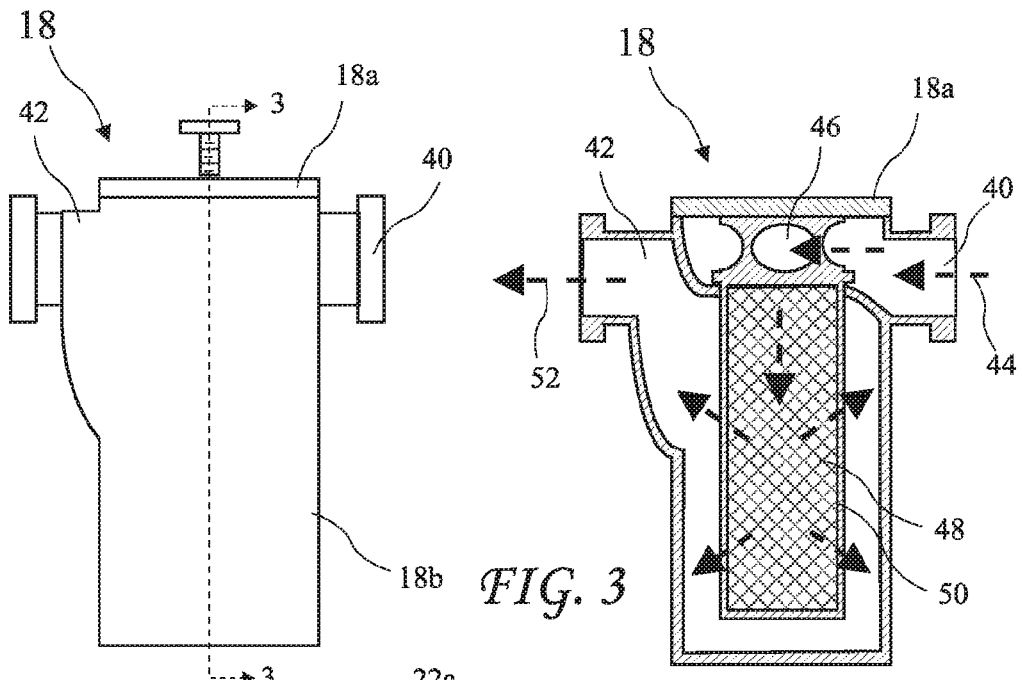
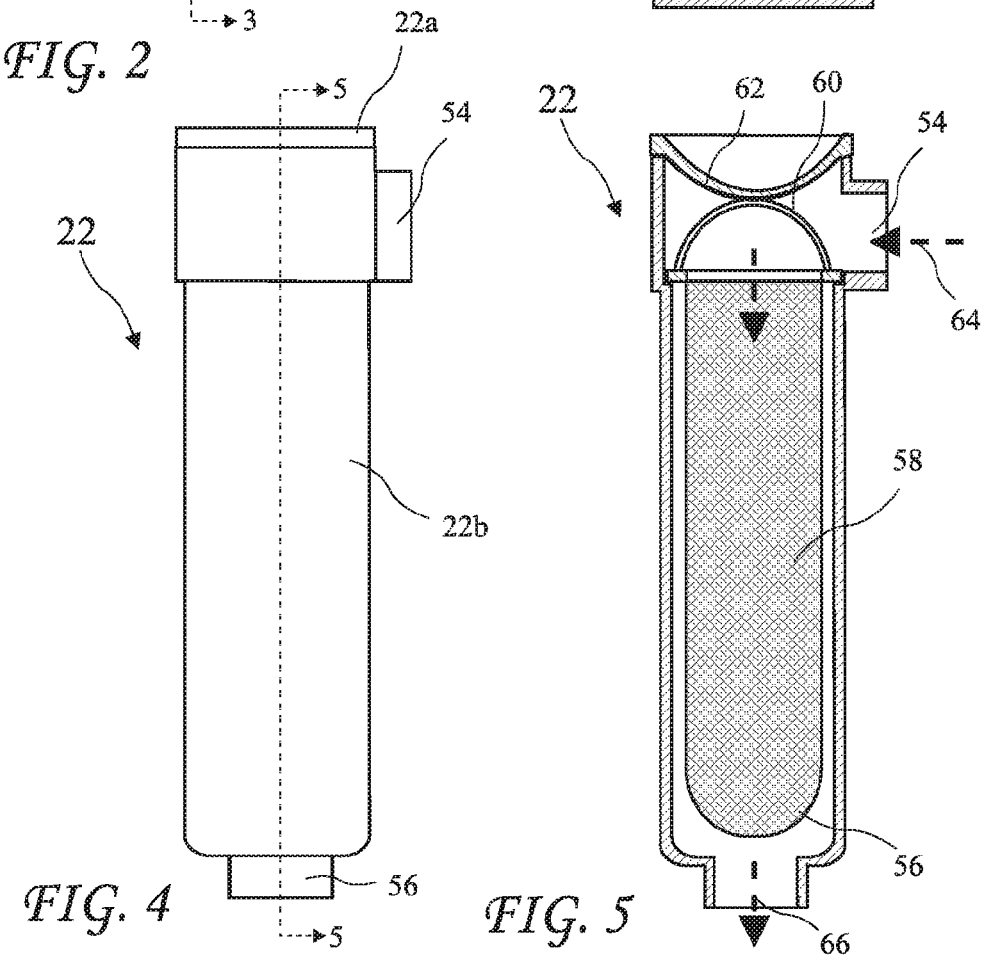

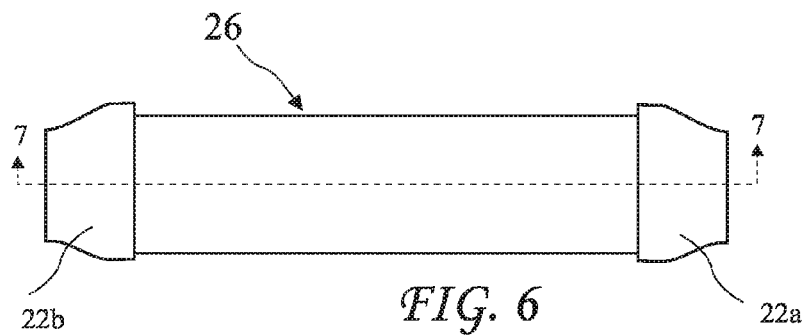
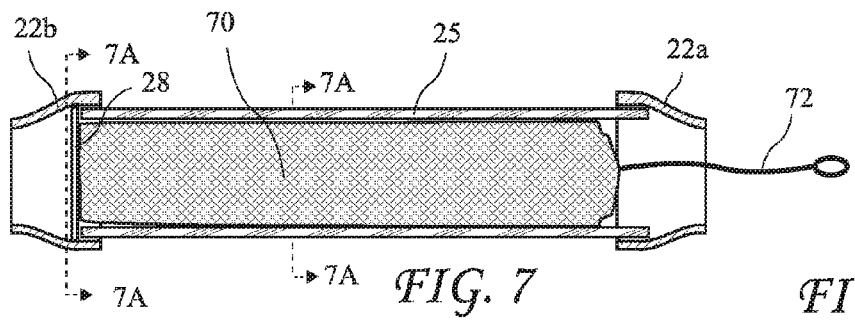 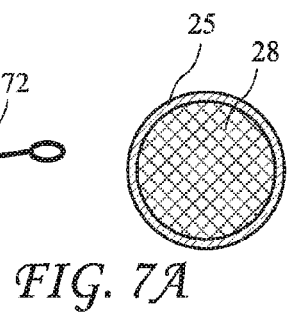
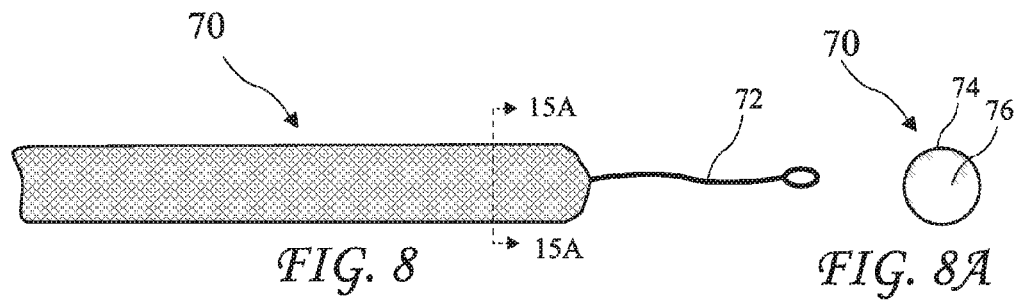
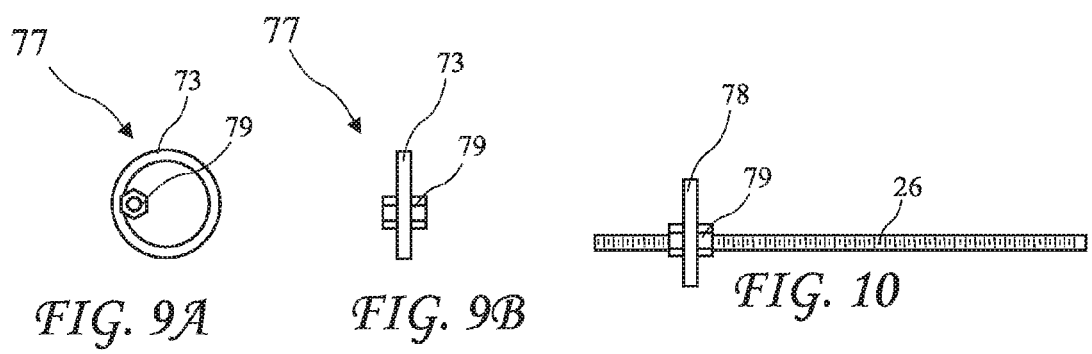

WASTE WATER FILTERING SYSTEM

The present application is a Continuation In Part of U.S. patent application Ser. No. 11/829,830 filed Jul. 27, 2007, which application is incorporated in its entirety herein by reference

BACKGROUND OF THE INVENTION

The present invention relates to containment of stagnant, polluted, and/or contaminated liquids and in particular to containment, filtration, and discharge of the stagnant, polluted, and/or contaminated water released from sprinkler systems during periodic testing.

Although the water entering a sprinkler system is generally potable water, there are subsequent effects which may drastically reduce the quality of the water in such systems. This water often remains in the sprinkler system for one or more years becoming contaminated, stagnant, and stale, having a very foul odor. Black iron pipe is generally used since it is more economical than potable piping, but unfortunately black iron pipe is prone to rusting which contaminates water residing in the black iron pipe. Also, new black iron pipe has an oil coating to protect it from rusting between manufacture and installation. This oil coating also contaminates the water.

In addition to the effects of using black iron pipe, the water residing in fire sprinkler lines in most buildings is contaminated with pollutants including chemicals, toxins, and disease causing agents. Nitrates, poly-phosphates and other corrosive inhibitors, as well as fire suppressants and anti-freeze may be added to the sprinkler water system as well. Also, between sprinkler system flushes, the water residing in the pipes may accumulate iron, magnesium, lead, copper, nickel, and zinc. This water generally becomes toxic and contains living and dead bacteria and breakdown products from chlorination. This may result in a significant Biochemical Oxygen Demand (BOD) problem. The BOD is a measure of the amount of oxygen required for the biochemical degradation of organic material in a water sample.

Such sprinkler systems are common in both residential and commercial buildings. Because of the obvious safety issues with reliance on a sprinkler system, periodic testing of sprinkler systems is required by the National Fire Protection Association (NFPA) standards (NFPA13). Such tests generally include draining and flushing stagnant, polluted, and/or contaminated water from the sprinkler systems and generally results in the stagnant, polluted, and/or contaminated water run off into the storm drains. The sprinkler tests include a Quarterly Fire Sprinkler Test, a Quarterly Drain Test, a Yearly Flow Test, a 5-Year Fire Sprinkler Certification Test, and a Flush Test for all new fire sprinkler system installations.

The Quarterly Fire Sprinkler Test includes placing an intentionally broken sprinkler head at the end of a sprinkler pipe to simulate an actual fire sprinkler activation. Fire sprinklers are designed to include an inspector's test valve attached with one inch piping leading to the outside of the building. Once the inspector's test valve is opened, it detects the broken sprinkler head and simulates an actual fire sprinkler activation. The inspector attempts to confirm that the local bell for the building goes off and also that a monitoring company has received a signal indicating that the sprinkler system has been activated. Stagnant, polluted, and/or contaminated water is released during this test and generally runs off into storm drains leading to streams, lakes and beaches.

The Quarterly Drain Test is required by the NFPA and insurance companies and requires opening a drain valve at a sprinkler riser for a few seconds and then closing the drain valve quickly to see how quickly a pressure gauge returns to normal pressure. The Quarterly Drain Test assures that a main valve out in the street is open and has not been accidentally closed by a public works employee. Again, the stagnant, polluted, and/or contaminated water released during this test generally runs off into the storm drains leading to streams, lakes and beaches.

The Yearly Flow Test is required by the NFPA on public and on-site fire hydrants (hydrants on private properties). The hydrant's valve is exercised and flowed. A diffuser is connected to a 2½ inch outlet on the fire hydrant and a pilot tube is used to measure the flow in Gallons Per Minute (GPM) and residual pressure when the valve is fully open. Again, stagnant, polluted, and/or contaminated water is released during this test and generally runs off into the storm drains leading to streams, lakes and beaches.

The Five Year Sprinkler Certification Test is perhaps the most important of all the fire sprinkler tests because without this certification, occupancy of the building cannot be granted. A portion of the Five Year Sprinkler Test requires that a backflush test be performed. The backflush test requires that a check valve located by the Fire Department Connection (FDC) be reversed or blocked in the open position in order to perform the test. This procedure requires one to shut-off the main control valve and to remove (generally unbolt) and reverse the check valve. The control valve is then opened allowing water to run freely out to the FDC outlets which is an FDC inlet during normal operation. Such backflush insures that the FDC is free and clear of any obstructions, debris or foreign objects. If an FDC is clogged by such debris, or even merely contains such debris, the debris may enter the sprinkler system and may cause damage to the fire sprinkler system and/or make the system inoperable or less effective. The FDC is normally located by the sidewalk a few feet from the storm drains. The Five Year Sprinkler Certification Test is usually witnessed by the Fire Department to confirm that the FDC is clear. When this test is performed, the stagnant, polluted, and/or contaminated water released during the test generally runs off into the storm drains leading to streams, lakes and beaches.

Another NFPA requirement is that all new fire sprinkler system installations must have a Flush Test performed. The fire sprinkler system receives water from a Water Department's main potable water system (or main) generally running under a street in front of the building containing the system. An underground utilities company is usually contracted to perform a Hot Tap into the main. This requires specialized equipment to cut into the main while it is still containing water under pressure and install a control valve. The underground contractor then runs underground piping to the property line. The fire sprinkler contractor takes over at the property line and continues the underground piping, installing a backflow preventor, an FDC, and a control valve. Prior to connecting into the sprinkler's riser, the Flush Test of the underground piping is required. This test is witnessed by the Fire Department. Often, the water in the underground piping is black, contains oil, metal shavings, debris, etc. This stagnant, polluted, and/or contaminated water generally is released into the storm drains leading to streams, lakes and beaches.

In addition to periodic testing, in the course of a tenant improvement project, the standard procedure for a Fire Sprinkler Contractor is to drain the sprinkler system. However, some trapped water remains in the lines and is later emptied into, for example, a 55 gallon drum with wheels. A serviceman dumps the water, which often includes stagnant, polluted, and/or contaminated water, to the curb which leads to the storm drains leading to streams, lakes and beaches.

The release of contaminated water into storm drains not only causes sickness, but sometimes even deaths in humans, animals and aquatic life. This water pollution problem, along with other industrial wastes, has contributed to rendering several recreational areas, streams, lakes and beaches completely contaminated and unsafe.

The "Federal Clean Water Act" requires that the fire sprinkler waste water flushed from a sprinkler system be directed to a sewer leading into a water treatment plant. Under no circumstances should fire sprinkler water containing high levels of pollutants be allowed to enter the storm drains. The illegal practice of allowing contaminated fire sprinkler water to enter the storm drains has been ongoing for decades, perhaps since fire sprinklers were first introduced to the public, in spite of stiff fines and penalties from the Water Districts. Because of the present difficulty in satisfying the Federal Clean Water Act, sprinkler system tests are still conducted which allow the polluted water to enter storm drains.

Although some municipalities have started requiring containment of this flushed polluted water when performing these tests, known apparatus and methods have failed. Some have suggested running hoses connected to the FDC directly to a sewer line. Unfortunately, the sewer lines are often blocks away from the FDC and this procedure would require traffic control since the sewer plates are located in the middle of the streets. Also, the fire inspectors would have to be present at the street sewer plate to witness the clear water indicating that the FDC has been flushed and cleared.

Another proposed method is to have a waste management disposal company collect the water and then transfer it to a water treatment plant. But to coordinate with a fire inspector and a waste management disposal company is problematic. Because of the fire department inspector's heavy workload, they are often late for these scheduled tests. The added cost to contract a waste management disposal company, and have them also wait for the inspector, would have to be passed on to the business owner and would be cost prohibitive.

U.S. patent application Ser. No. 11/829,830 filed Jul. 27, 2007 for "WASTE WATER FILTERING SYSTEM," describes a waste water treatment system having a site tube connected to a Fire Department Connection (FDC) or some other waste water drain point, and a filter suite including a stainer to capture large particles, a filter to capture small particles, and a chemically selective sponge to capture, for example, oil, and destroy bacteria. Unfortunately, the clear site tube may fail under the pressure encountered in waste water systems, and an encased chemically selective polymer element of the filter suite was not sized for optimal performance.

BRIEF SUMMARY OF THE INVENTION

The present invention addresses the above and other needs by providing a waste water filtration system which filters polluted waste water from various waste water sources including fire sprinkler systems and fire hydrants. The system includes a clear hose which connects to a female swivel connection on, for example, a Fire Department Connection (FDC) at a first end, and to a mobile filtering suite at an opposite second end. The clear hose allows the observation of a waste water flow from the waste water source to ensure that a complete flushing has been accomplished. The filtering suite includes a stainer to capture large particles, a filter to capture small particles, and a chemically selective sponge to capture, for example, oil, and destroy bacteria. The filtering suite allows compliance with NFPA Standards, California State Fire Marshal's "Title 19 Regulations for maintaining fire sprinkler systems, and Federal Clean Water laws, Federal Coastal Zone laws, and local city ordinances for releasing liquids into storm drains.

In accordance with one aspect of the invention, there is provided a feasible and cost effective system waste water filtering system including a clear rubber hose for observing the clarity of a waste water flow, a filtering suite connected to the clear hose for receiving the waste water flow from the clear hose, and a drain hose connected to an outlet of the filtering suite for carrying the clean flow to a drain site. The filtering suite sequentially includes first, a strainer for capturing large particles in the waste water flow to create a strained flow, second, a filter for capturing small particles remaining in the strained flow to create a filtered flow, and third, a three inch pipe nipple encasing chemically selective polymer for capturing oils in the filtered flow to create a clean flow. A washer shaped rod adapter is held between fittings connecting the clear hose to the FDC. The rod adapter holds a rod which protrudes from the fittings into the FDC and holds a clapper in the FDC open during the backflush test. The rod is preferably a ⅜ inch all thread rod. The clear rubber hose allows a fire department inspector to visually observe a waste water flow through the clear hose change from dirty to clean as the flushing of the fire sprinkler system is performed. When sufficient filtering is performed, and proper permission obtained from local authorities, the filtered waste water may be released into storm drains. Different standard fittings may be used for different applications, for example, Quarterly and Drain Tests.

In accordance with yet another aspect of the invention, there is provided a method for waste water filtering. The method includes: connecting a first end of a clear rubber hose to a Fire Department Connection (FDC); connecting a second end of the hose to a filter suite, the filter suite sequentially comprising a strainer, a filter, and an encased chemically selective polymer; positioning a filter system drain hose to empty into at least one of a storm drain and landscaping; releasing a flow of waste water from the FDC through the clear hose to the filter suite; observing the flow of waste water through the clear hose; continuing the flow of waste water until a clean flow is observed in the clear hose; and shutting off the flow of waste water from the FDC.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 is a side view of a strainer of a filtering suite according to the present invention.

FIG. 3 is a cross-sectional view of the strainer taken along line 3-3 of FIG. 2.

FIG. 4 is a side view of a filter of a filtering suite according to the present invention.

FIG. 5 is a cross-sectional view of the filter taken along line 5-5 of FIG. 4.

FIG. 6 is a cross-sectional view of a pipe nipple encasing a chemically selective polymer.

FIG. 7 is a cross-sectional view of an encased chemically selective polymer taken along line 7-7 of FIG. 6.

FIG. 7A is a cross-sectional view of the encased chemically selective polymer taken along line 7A-7A of FIG. 7.

FIG. 8 is a side view of a media bag filter containing the chemically selective polymer.

FIG. 8A is cross-sectional view of the media bag of the media bag filter containing the chemically selective polymer taken along line 8A-8A of FIG. 8.

FIG. 9A is a front view of a second all thread rod adapter for positioning the all thread rod in the FDC to hold the clapper valve open.

FIG. 9B is a side view of the second all thread rod adapter for all thread positioning the rod in the FDC to hold the clapper valve open FIG. 10 shows a side view of an all thread rod in the second all thread rod adapter.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
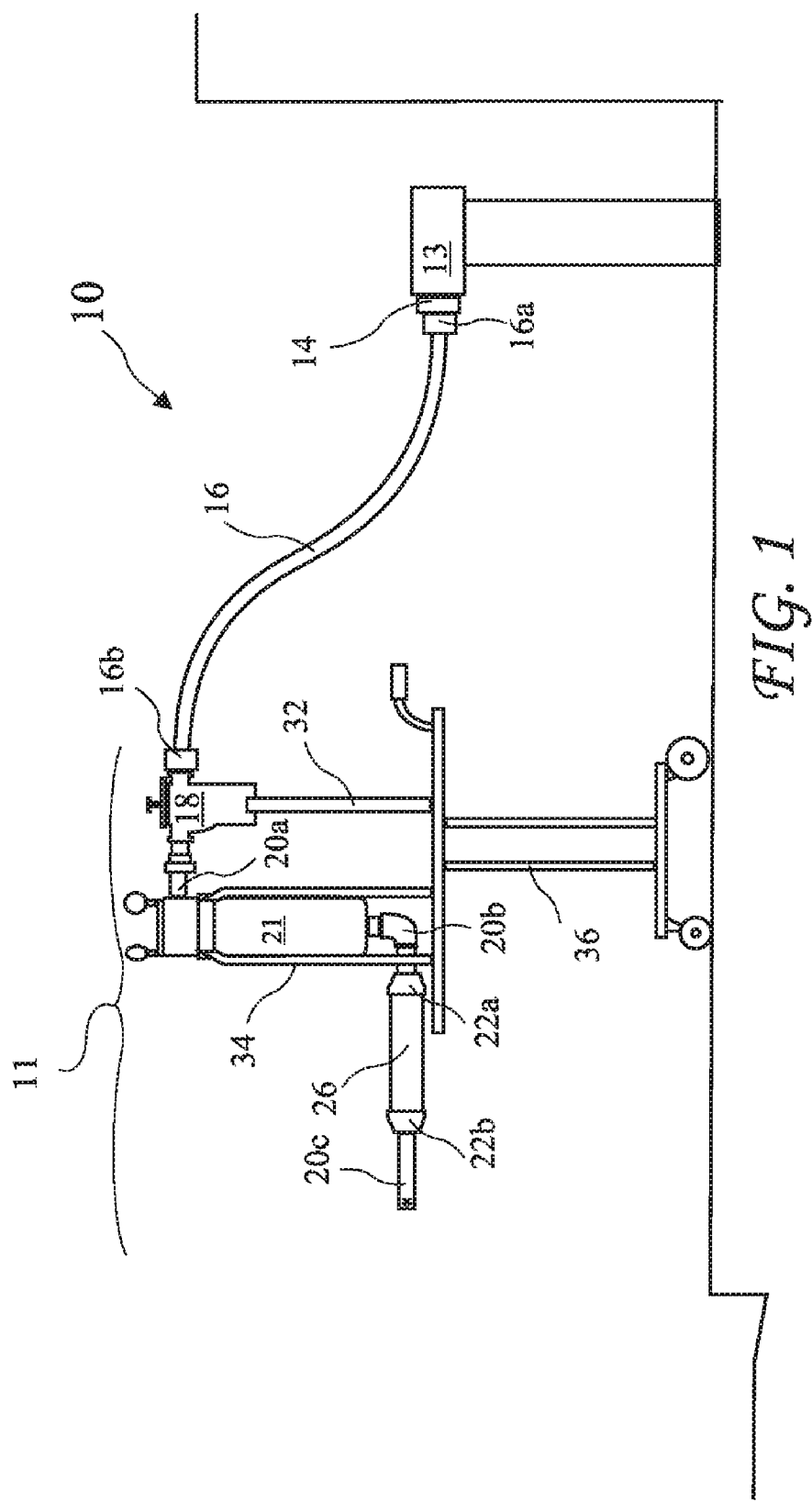
FIG. 1 depicts a waste water filtering system according to the present invention connected to a Fire Department Connection (FDC).

A waste water filtering system 10 according to the present invention is shown connected to a waste water source comprising a Fire Department Connection (FDC) 13 in FIG. 1. The waste water filtering system 10 includes a hose 16 and a filtering suite 11. The hose 16 is a clear hose to allow viewing of waste water passing through the hose 16, and is preferably a clear rubber hose. The hose 16 is connected to the FDC 13 using a swivel connection 16a and to the filter suite using a swivel fitting 16b. An FDC outlet 14 resides between the swivel connection 16a and the FDC 13 to position a rod 26 (see FIG. 11) to hold a clapper valve in the FDC 13 open. The hose 16 is preferably a two inch diameter non-kink hose. A suitable material is Polyvinylchloride (PVC) and an example of a suitable hose is Tufflex® 101CL hose made by Gates Corporation in Denver, Colo.

The filter suite 11 resides on a cart 36. The cart 36 may be fixed height or may be vertically collapsible and may be adapted to carry on a trailer. The waste water filtering system 10 may also be applied to filtering waste water released from sources other than the FDC 13, and in those instances an appropriate connection may be used, or an adapter between the hose 16 and the waste water source may be used.

The filtering suite 11 includes the strainer 18, a filter 21 connected to the strainer 18 by a hose 20, and an encased chemically selective polymer 26 connected to the filter 21 by another hose 20. The strainer 18 receives a waste water flow from the FDC 13 through the hose 16 and strains the waste water flow to create a strained flow. The filter 21 receives the strained flow from the strainer 18 and filters the strained flow to create a filtered flow. A first stand 32 supports the strainer 18 and a second stand 34 supports the filter 21. The strainer 18 is connected to the filter 21 by first plumbing 20a and the filter 21 is connected to the encased chemically selective polymer 26 by second plumbing 20b. The encased chemically selective polymer 26 receives the filtered flow from the filter 21 and cleans the filtered flow to create a clean flow 30 in outlet plumbing 20c, suitable for draining into a storm drain or into landscaping.

A side view of the strainer 18 of the filtering suite 11 is shown in FIG. 2, and a cross-sectional view of the strainer taken along line 3-3 of FIG. 2 is shown in FIG. 3. The strainer 18 includes a removable, cleanable, and replaceable basket 48. The waste water flow 44 enters the strainer 18, passed into the basket 48 through ports 46, and is strained as it flows through the basket walls 50. The basket walls 50 preferably include orifices to capture particles greater than between approximately 50 microns and approximately 100 microns in size, and more preferably include orifices to capture particles greater than approximately 100 microns in size. A strained flow 53 is created by the strainer 18. An example of a suitable strainer is an Eaton Model 72 made by Eaton in Eden Prairie, Minn.

A side view of the filter element 21 of a filtering suite 11 is shown in FIG. 4, and a cross-sectional view of the filter 21 taken along line 5-5 of FIG. 4 is shown in FIG. 5. The filter 18 includes a filter bag 58 having a surface material 56 preferably selected to capture material greater than between approximately 0.5 microns and two microns in size, and more preferably selected to capture material greater than approximately one micron in size. A filtered flow 66 is created by the filter 21. An example of a suitable filter is a Flowline filter made by Eaton in Eden Prairie, Minn.

A cross-sectional view of the encased chemically selective polymer 26 encasing a chemically selective polymer is shown in FIG. 6. The chemically selective polymer is encased in a pipe nipple 25 having a length L and diameter D. The length L may be between approximately twelve inches and approximately 36 inches and is preferably approximately 12 inches. The diameter D may be between approximately two inches and approximately four inches and is preferably approximately three inches. Inlet and outlet reducers 22a and 22b respectively reside at each end of the pipe nipple 25 for attachment to the plumbing 20b and 20c (see FIG. 1).

A cross-sectional view of the encased chemically selective polymer 26 taken along line 7-7 of FIG. 6 is shown in FIG. 7 and a cross-sectional view of the encased chemically selective polymer 26 taken along line 7A-7A of FIG. 7 is shown in FIG. 7A. A media bag filter 70 reside inside the pipe nipple 25 and contains the chemically selective polymer. The chemically selective polymer is preferably ground into a powder to improve the performance of the chemically selective polymer in capturing contaminants (is there a measure of how fine it is ground?). The media bag filter 70 is retained in the pipe nipple 25 by a grating 28 fixed in the outlet reducer 22b. The grating 28 is preferably a wire mesh screen with approximately ½ inch openings.

A side view of a media bag filter 70 is shown in FIG. 8 and a cross-sectional view of the media bag filter 70 taken along line 8A-8A of FIG. 8 is shown in FIG. 8A. The media bag filter 70 comprises a bag 74 containing the chemically selective polymer 76. The bag 74 is preferably an open woven mesh fabric polyester. Initially, the bag 74 is filled approximately 50 percent by volume with the chemically selective polymer 76. The chemically selective polymer 76 expands as it become saturated with oil, and eventually fills the interior of the media bag filter 70. The media bag filter 70 includes a pull 72 for extracting the media bag filter 70 from the encased chemically selective polymer 26 A suitable material for the bag 74 is product No. 07/950/58 made by Sefar in Monterey Park, Calif. A suitable chemically selective polymer is a Smart Sponge® material or a Smart Sponge® Plus ACX10N/55-Plus4 material made by AbTech in Scottsdale, Ariz. Smart Sponge® Plus material includes an antimicrobial agent permanently chemically bonded to the Smart Sponge® polymer surface which antimicrobial agent destroys bacteria on contact. Due to the permanent bonding, the antimicrobial agent is active but does not leach or leak, avoiding downstream toxicity issues.

The Smart Sponge® material and similar material are described in:

U.S. Pat. No. 7,125,823 for "Methods of Making Dual-action Decontamination Media";

U.S. Pat. No. 6,541,569 for "Polymer Alloys, Morphology and Materials for Environmental Remediation";

U.S. Pat. No. 6,344,519 for "Systems for Ameliorating Aqueous Hydrocarbon Spills";

U.S. Pat. No. 6,143,172 for "Methods for Ameliorating Hydrocarbon Spills in Marine and Inland Waters"; and U.S. Pat. No. 6,099,723 for "Catchbasin Systems for Filtering Hydrocarbon Spills."

The '823, '569, '519, '172, and '723 patents' are herein incorporated in their entirely by reference.

A front view of a rod adapter 77 for positioning the rod 26 in the FDC 13 to hold the clapper valve open is shown in FIG. 9A, a side view of the rod adapter 77 is shown in FIG. 9B, and the rod 26 is shown attached to the rod adapter 77 in FIG. 10. The nut or coupling 79 is attached directly to a washer 73 which is positioned between fitting attached to the FDC 13 to hold the clapper valve open. The rod adapter 77 may be positioned between any hose or any other attachment connected to the FDC 13 and the FDC 13, and is preferably held in place between the hose end 16a and the FDC outlet 14. When in position, the rod 26 enters the FDC 13 and holds the clapper valve open. The rod 26 is preferably an all-thread rod.

Figure 11:
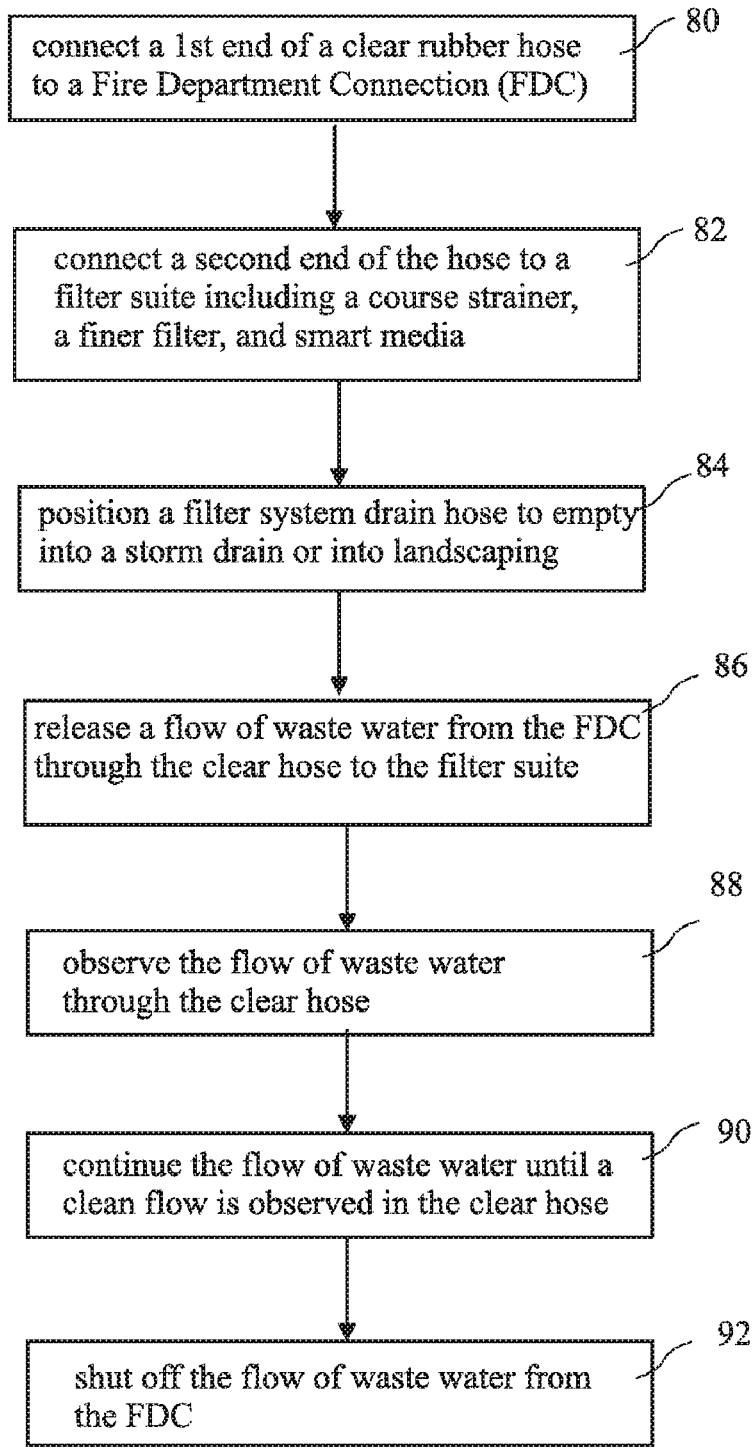
FIG. 11 is a method according to the present invention for filtering waste water released from the FDC.

A method according to the present invention for containing and transporting waste water is described in FIG. 11. The method includes: connecting a first end of a clear rubber hose to a Fire Department Connection (FDC) at step 80; connecting a second end of the hose to a filter suite serially comprising a strainer, a filter, and an encased chemically selective polymer at step 82; positioning a filter system drain hose to empty into a storm drain and/or landscaping at step 84; releasing a flow of waste water from the FDC through the clear hose to the filter suite at step 86; observing the flow of waste water through the clear hose at step 88; continuing the flow of waste water until a clean flow is observed in the clear hose at step 90; and shutting off the flow of waste water from the FDC when a clean flow is observed at step 92.

While the invention herein disclosed has been described by means of specific embodiments and applications thereof, numerous modifications and variations could be made thereto by those skilled in the art without departing from the scope of the invention set forth in the claims.

I claim:

1. A wastewater filtering system comprising:
    a clear hose for observing a flow of waste water;
    a filtering suite connected to the clear hose for receiving the waste water flow from the clear hose, the filtering suite sequentially comprising:
        first, a strainer for capturing large particles in the waste water flow to create a strained flow;
        second, a filter for capturing small particles remaining in the strained flow to create a filtered flow; and
        third, an encased chemically selective polymer for capturing oils in the filtered flow to create a clean flow; and
    a drain hose connected to an outlet of the encased chemically selective polymer for carrying the clean flow to a drain site.

2. The waste water filtering system of claim 1, wherein the strainer includes a strainer element for capturing particles greater than between approximately 50 microns and approximately 100 microns.

3. The waste water filtering system of claim 2, wherein the strainer element comprises a removable, cleanable, and replaceable basket for capturing the particles greater than between approximately 50 microns and approximately 100 microns in size.

4. The waste water filtering system of claim 1, wherein the filter includes a filter element for capturing particles greater than between approximately 0.5 microns and approximately two microns in size.

5. The waste water filtering system of claim 1, wherein the encased chemically selective polymer comprises an encased chemically selective polymer including an antimicrobial agent for destroying bacteria in the filtered flow.

6. The waste water filtering system of claim 1, wherein the encased chemically selective polymer comprises a chemically selective polymer encased in a pipe nipple.

7. The waste water filtering system of claim 1, wherein the waste water source is a Fire Department Connection (FDC).

8. The waste water filtering system of claim 7, further including a fitting for removably attaching a rod for entering the FDC to hold a clapper valve open to allow the waste water to flow from the FDC.

9. The waste water filtering system of claim 1, wherein the encased chemically selective polymer additionally kills bacteria.

10. The waste water filtering system of claim 1, wherein the filter suite resides on a vertically collapsible cart.

11. A waste water filtering system comprising:
    a clear rubber hose for observing the clarity of a waste water flow from a waste water source;
    a filtering suite connected to the clear rubber hose for receiving the waste water flow, the filtering suite sequentially comprising:
        first, a strainer for capturing large particles greater than between approximately 50 microns and approximately 100 microns in size in the waste water flow to create a strained flow;
        second, a filter for capturing small particles greater than between approximately 0.5 microns and approximately two microns in size remaining in the strained flow to create a filtered flow; and
        third, an encased chemically selective polymer for capturing oils in the filtered flow to create a clean flow; and
    a drain hose connected to an outlet of the encased chemically selective polymer for carrying the clean flow to a suitable drain site.

* * * * *